United States Patent [19]
Adams, deceased

[11] 3,830,489

[45] Aug. 20, 1974

[54] VENEER CONVEYING METHOD

[76] Inventor: John R. Adams, deceased, late of P.O. Box 718, Sutherlin, Oreg. by United States National Bank of Portland

[22] Filed: Apr. 24, 1972

[21] Appl. No.: 246,674

[52] U.S. Cl..................... 271/9, 156/299, 156/563, 214/8.5 D, 271/94
[51] Int. Cl............................................. B65h 3/12
[58] Field of Search.......... 271/74, 26 ES, 34, 9, 94, 271/96; 198/202; 214/8.5 D, 8.5 G; 156/563, 570, 299, 300, 559, 556

[56] References Cited
UNITED STATES PATENTS

| | | | |
|---|---|---|---|
| 2,813,637 | 11/1957 | Perry et al. | 271/74 X |
| 2,914,957 | 12/1959 | Johnson | 198/202 X |
| 3,090,534 | 5/1963 | Frommer et al. | 198/202 UX |
| 3,477,558 | 11/1969 | Fleischauer | 271/74 X |
| 3,730,816 | 5/1973 | Crawford | 156/563 X |

Primary Examiner—Richard A. Schacher
Assistant Examiner—Bruce H. Stoner, Jr.
Attorney, Agent, or Firm—Kolisch, Hartwell & Dickinson

[57] ABSTRACT

A wide-belt overhead vacuum conveyor for carrying veneer sheets along a path with the sheets extending transversely of the path. The conveyor includes an endless, elongated, perforate conveyor belt having a width substantially spanning the length of the veneer sheets to be carried. The belt has a lower reach extending in the direction of the path and is driven under power along the path. A vacuum manifold having a width spanning the width of the belt overlies the lower reach of the belt. The underside of the chamber is formed of spaced-apart support rollers disposed with their undersides in a common, substantially horizontal plane. Evacuation of the vacuum chamber draws air through the perforate belt, with the support rollers preventing the belt from being drawn into the manifold. The belt also is trained over an adjustment roller which may be selectively canted to produce tracking of the belt toward either side of the path to keep it centered on the path.

1 Claim, 3 Drawing Figures

PATENTED AUG 20 1974 3,830,489

VENEER CONVEYING METHOD

This invention relates to a wide-belt vacuum conveyor, and more particularly to such a conveyor which employs a perforate conveyor belt having a width which substantially spans the width of the path along which a veneer sheet is to be carried and supports substantially the entire sheet as it is conveyed therealong.

In the laying up of plywood panels, manufacturers are coming more and more to the use of mechanized conveyor systems for handling veneer. In such systems face, back, core and center sheets are deposited on a conveyor in the appropriate sequence to enable the panel to be laid up, or stacked, most easily by automatic means or by the fewest number of workers. The face, back and center sheets generally are single sheets of veneer which have the general dimensions of a panel to be produced and have grain which extends lengthwise of the panel.

In the past, the core layer of a plywood panel generally has been produced by laying individual narrow strips of core pieces in edge-to-edge relationship on a face, center, or back sheet, with each strip having a length generally equivalent to the width of the panel to be laid up. The grain in such core pieces generally extends across the width of the panel. Recently, methods have been devised for joining separate core pieces in edge-abutting relationship to form core sheets having the general dimensions of a panel to be laid up. Although the core pieces in a core sheet thus produced are joined against separation from each other, the core sheet has little rigidity and is difficult to handle.

In the past, where overhead vacuum conveyors have been used to transport veneer sheets, it has been the practice generally to use a pair of relatively narrow, elongated perforate belts which are operable to carry a veneer sheet (either back, face, center or core) with such belts extending transversely of the grain of the sheet. Vacuum is applied through perforations in the belt, whereby the veneer piece is held by suction against the underside of the belt. Such belts generally have engaged only a minor portion of the surface of a veneer sheet thus handled.

Since the vacuum belts in previous organizations have been relatively narrow and engaged only a minor portion of the surface of a sheet handled they have required the use of high powered exhaust fans to produce sufficient vacuum to hold the veneer against the belt. More importantly however, such generally require that the belts extend transversely of the veneer grain. This is especially true in the case of core sheets which have little rigidity of their own in a direction paralleling the grain of the individual core pieces in the sheet. Since such belts must pick up sheets by extending across the grain, it means that the belts designed for handling core pieces in a conveyor system cannot be utilized for handling faces, backs or centers, and vice versa.

A general object of the present invention is to provide a novel vacuum belt conveyor which is operable to handle veneer sheets interchangeably, regardless of the direction of the grain in the sheets.

More specifically, an object is to provide a vacuum belt conveyor which includes a perforate vacuum belt and an associated vacuum chamber which have widths substantially spanning the width of the path along which sheets are to be carried.

Another object is to provide a novel vacuum belt conveyor which is so constructed as to minimize the power required to hold articles by suction on the belt.

Yet another object is to provide a novel vacuum belt conveyor wherein a perforate, endless vacuum belt runs freely over a plurality of rollers, and at least one of the rollers is mounted for selective canting, whereby its position relative to the path may be changed to cause the belt to track to one side or the other of the path. With such construction the position of the belt on the rollers may be controlled without the need for mechanical means physically engaging and confining the edges of the belt.

These and other objects and advantages will become more fully apparent as the following description is read in conjunction with the drawings, wherein.

Figure 1:
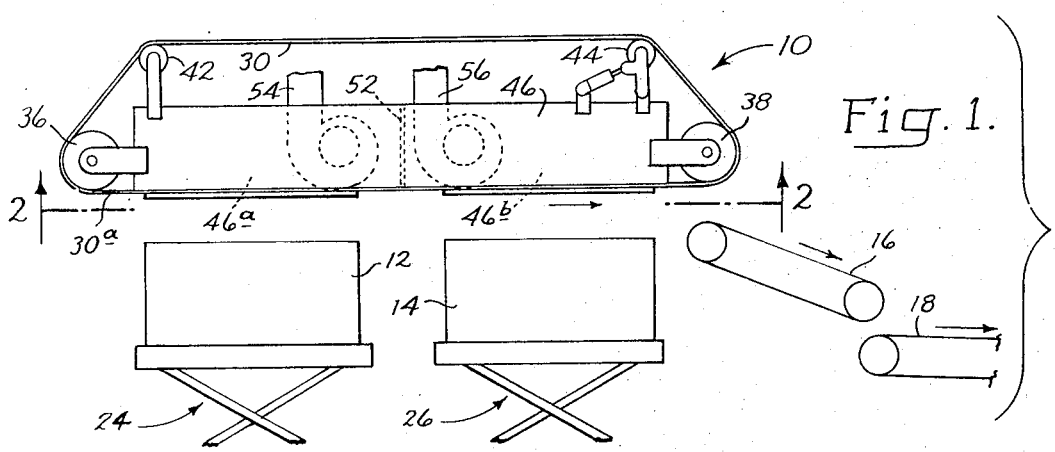
FIG. 1 is a schematic side elevation view of a vacuum belt conveyor according to the invention.

Referring now to the drawings, and first more specifically to FIG. 1, at 10 is indicated generally an overhead vacuum belt conveyor according to the invention. Conveyor 10 is operable to pick up veneer sheets from underlying stacks 12 and 14 and convey the same along a substantially horizontal path to the right in FIG. 1 to deposit them on a transfer conveyor belt 16, which carries them onto another conveyor belt 18. Stacks 12, 14 may be stacks of either faces, backs, centers, or core sheets.

Figure 2:
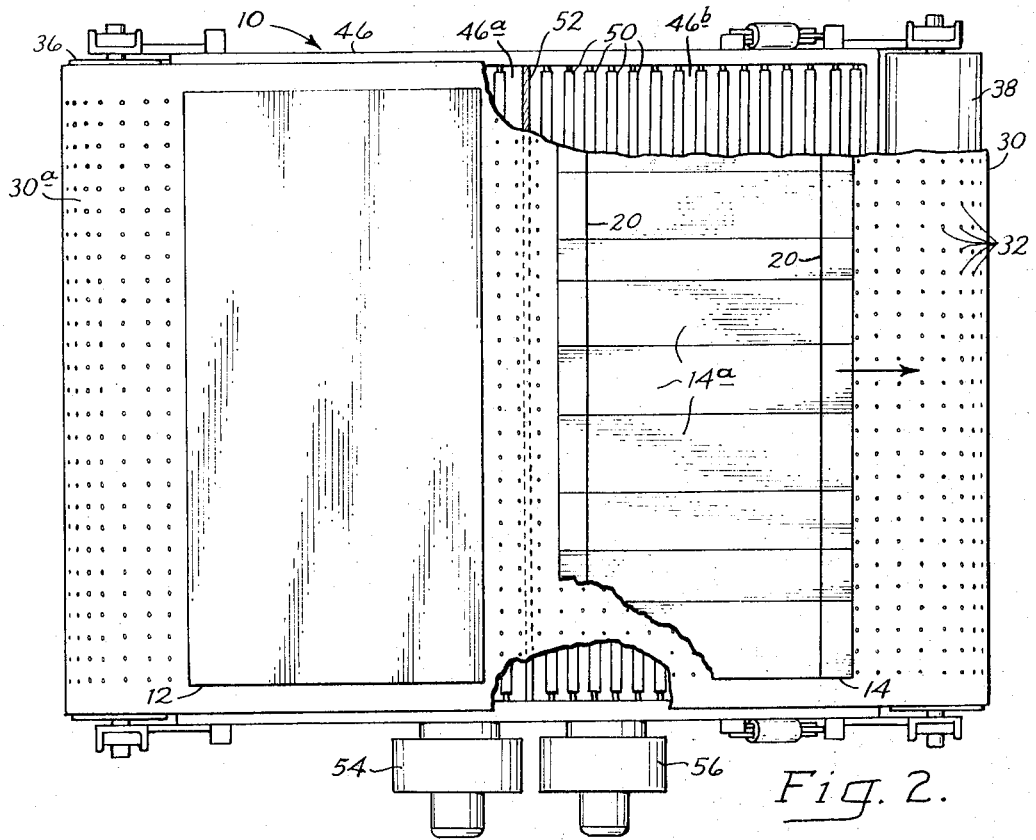
FIG. 2 is an enlarged bottom view of the apparatus taken generally along the line 2—2 in FIG. 1 with portions broken away.

As is illustrated in FIG. 2, where a sheet from each of the stacks is held against the vacuum belt conveyor, sheets 12 are full-size face, back or center sheets with the grain therein extending lengthwise of the sheet and transversely of the path. Sheets 14 are core sheets, each being formed of a plurality of edge-connected core pieces, or strips, 14a. The grain of the individual core pieces and the joints between adjacent pieces extend across the width of the sheet and parallel to the path of the conveyor. Several methods are available for joining such core pieces. In FIG. 2 strings 20 are illustrated which extend across the edges of the core pieces adjacent opposite edges of the sheet and are glued to the core pieces.

Stacks 12, 14 are supported on scissor-lifts 24, 26, respectively. The scissor-lifts may be automatically controlled, whereby each raises the stack supported thereon until the top sheet on the stack engages the underside of conveyor 10 and then is lowered.

Describing conveyor 10 in detail, it includes an endless, elongated conveyor belt 30 having a width which spans substantially the length of sheets to be carried thereon, as seen in FIG. 2. It has been found to be desirable for such a belt to have a width which is 80 percent or more of the length of the sheets. The belt has holes, or perforations, 32 distributed over substantially the entire area of the belt through which air may be drawn through the belt.

A pair of elongated, parallel, laterally spaced, horizontal rollers 36, 38 extend transversely of the path. As is seen in FIG. 1, the undersides of rollers 36, 38 lie in a common, substantially horizontal plane. Belt 30 is trained over rollers 36, 38 to define a lower reach 30a for the belt which extends between the rollers. At least one of the rollers is powered for driving the lower reach of the belt in the direction of the path (to the right in FIGS. 1, 2 and 3).

Figure 3:
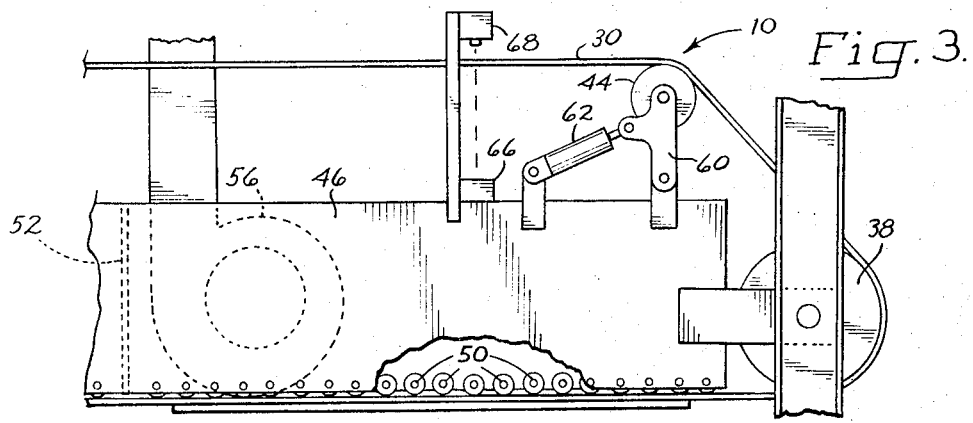
FIG. 3 is an enlarged side elevation view of one end of the vacuum belt conveyor with portions broken away.

An elongated vacuum manifold 46 overlies lower reach 30a of the belt. As is best seen in FIG. 2, the manifold is slightly wider than belt 30. The bottom of the manifold is open to belt 30 and has a plurality of elongated, parallel, laterally spaced rollers 50 extending transversely of the path between opposite sides of the manifold. Each of the rollers is journaled for rotation at its opposite ends on opposite sides of the manifold. The lower surfaces of the rollers all lie within a common, substantially horizontal plane as is best seen in FIG. 3. The interior of the vacuum manifold is divided into two separate chambers 46a, 46b of substantially equal length by an upright plate 52 extending fully across the manifold.

A pair of exhaust fans 54, 56 connect with chambers 46a, 46b, respectively, and are operable selectively to evacuate air from either one or both of the chambers.

A pair of elongated, horizontal idler rollers 42, 44 are mounted above rollers 36, 38, respectively, and extend transversely of the path. Belt 30 is trained over rollers 42, 44, with these rollers operating to maintain proper tension in the belt.

The edges of belt 30 are not confined on the rollers, and thus it is free to track laterally toward opposite sides of the path during operation. Roller 44 is mounted for selective canting in the apparatus to increase the tension on one side, or the other, of the belt, thus causing the belt to track in a desired direction to maintain it in a relatively central position on the rollers.

Referring to FIG. 3, the mounting for one end of roller 44 is illustrated in detail. It should be understood that the opposite end of the roller is similarly mounted and may be similarly controlled. Describing the mounting for roller 44, it includes an upright post 60 pivotally mounted at its lower end on one side of manifold 46. One end of roller 44 is journaled adjacent the upper end of post 60. An extensible-contractible ram 62 is pivotally connected at one of its ends to post 60 and at its other end to manifold 46. Selective extension or retraction of ram 62, or its corresponding ram at the other end of the roller, increases or decreases the tension at one, or the other, edge of belt 30. Explaining further, extension of ram 62 tenses the near edge of the belt 30. This causes the belt, when driven, to track away from the viewer, toward the opposite side of the apparatus. Conversely, retraction of ram 62 and extension of its corresponding ram at the other end of the roller causes the belt to track toward the viewer.

Referring still to FIG. 3, an electric eye sensor 66 secured to manifold 46 adjacent its near side and a light source 68 spaced above the top reach of belt 30 directing a beam of light toward sensor 66 are operable to sense when the belt shifts on the rollers to a predetermined position near the viewer. A similar electric eye sensor and light source combination are disposed adjacent the opposite side of the manifold.

These sensors adjacent opposite sides of the manifold are operatively connected through appropriate control mechanism to the rams which produce selective canting of roller 44. In operation, should the edge of belt 30 nearest the viewer shift to a position where it interrupts the light beam from light source 68, the appropriate control mechanism causes the rams to cant roller 44, causing the belt to track away from the viewer. Conversely, should the belt move to a position toward the opposite side of the manifold where it interrupts the light beam from the light source at the opposite side, selective canting of roller 44 will be produced to cause the belt to track toward the viewer in FIG. 3.

Describing now the operation of the apparatus and referring to FIG. 1, if it is desired to convey both a sheet 12 and a sheet 14 onto conveyor 16, both of exhaust fans 54, 56 are operated to evacuate their respective chambers in the manifold. Scissor-lifts 24, 26 are operated to raise their respective stacks until the upper sheet in each stack engages the underside of belt 30. Suction produced by air being drawn through the perforations in belt 30 holds such sheets against the underside of the belt. Lift mechanisms 24, 26 then are lowered and belt 30 is driven to convey the belt and the sheets thereon along the path and onto conveyor 16. Should it be desired to carry only a sheet 14, only chamber 46b would be evacuated.

It should be evident from the forgoing that since belt 30 has a width substantially spanning the length of the sheets to be handled, either core sheets, or face, back or center sheets may be carried interchangeably therealong. Further, since the suction produced by the belt is acting over substantially the full face of each sheet, less vacuum need be produced than is required with previously utilized narrow belts. Thus, the power requirement for evacuating the chambers is substantially reduced.

Since the edges of the belt are not physically confined and the positioning of the belt is controlled by a canting roller there is less wear on the belt and it is more easily maintained.

While a specific embodiment of the invention has been disclosed herein, it should be obvious to those skilled in the art that variations and modifications are possible without departing from the spirit of the invention.

What is claimed and desired to be secured by Letters Patent is:

1. A method of laying up veneer sheets in the making of plywood panels comprising providing a stack of veneer core sheets where the sheets in the stack have substantially the same width and length dimensions and are aligned vertically in the stack and the grain of said sheets have a common direction which extends across one dimension of the sheets, providing another stack of veneer sheets to one side of said stack of core sheets with the sheets of said other stack to be interspersed with the core sheets, the sheets in said other stack having the width and length dimension of the core sheets and being vertically aligned in the stack, the grain of said sheets in said other stack having a common direction which extends across a dimension of the sheets which is normal to said one dimension, said one and said other stacks of sheets being arranged with a common dimension of the sheets in the two stacks paralleling each other and with the stacks aligned in a direction extending transversely of this common dimension, and with a vacuum lifting successive sheets from the two stacks into a common substantially horizontal support plane and moving sheets while so lifted and occupying such plane to one side of the stacks of sheets with such movement being in a direction extending transversely of said common dimension, to produce a series of sheets moving in said support plane comprising core sheets interspersed with sheets from said other stack of sheets, the moving of such sheets in said support plane being done while supporting upper faces of the sheets from the two stacks throughout their said common dimension.

* * * * *